March 8, 1938. L. D. BAIRD 2,110,618
METHOD OF MAKING TAPS AND DIES
Filed Aug. 19, 1937
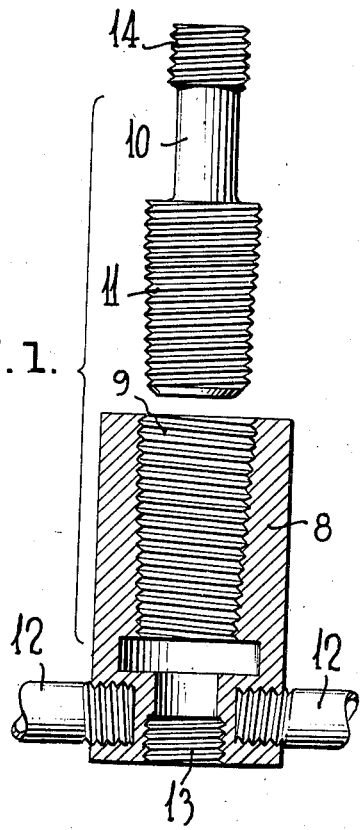
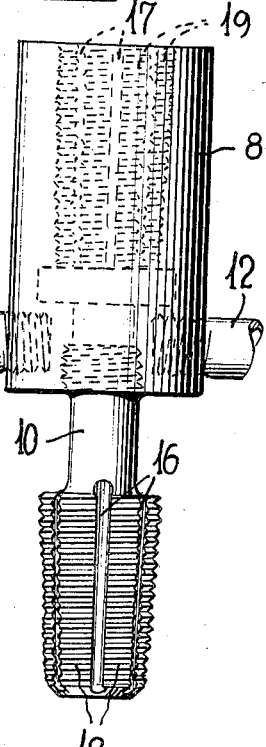
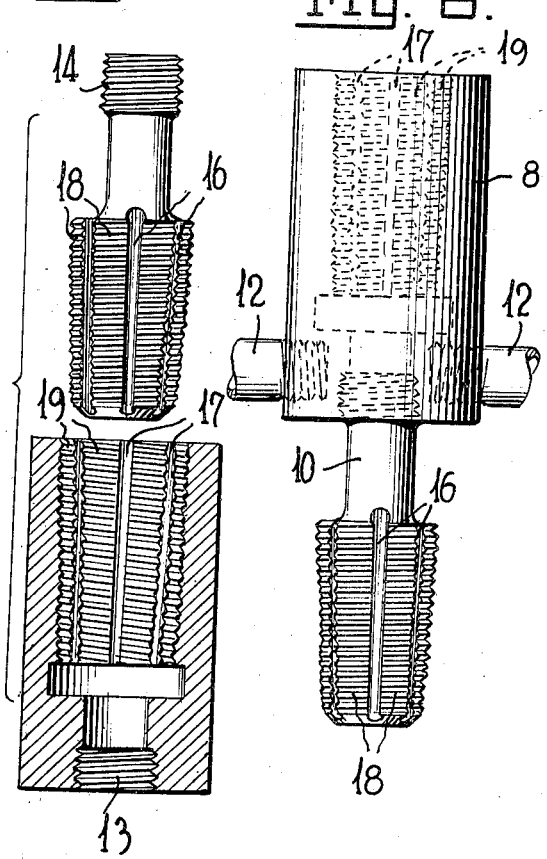
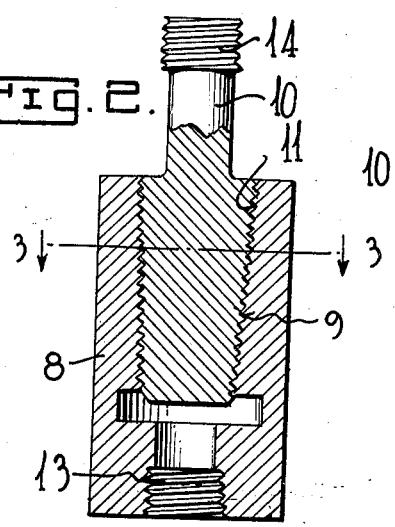
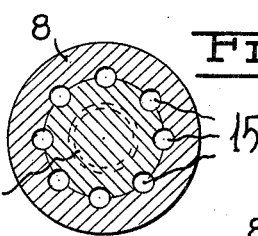
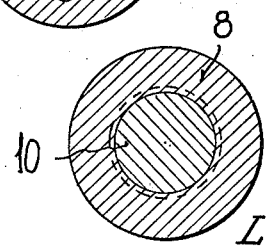
Inventor
L. D. Baird,
By Barry + Cyr
Attorneys Patented Mar. 8, 1938

2,110,618

UNITED STATES PATENT OFFICE 2,110,618

METHOD OF MAKING TAPS AND DIES

Lynne D. Baird, Tulsa, Okla., assignor to Baird Manufacturing Company, Tulsa, Okla., a corporation of Delaware Application August 19, 1937, Serial No. 159,977

3 Claims. (Cl. 76—101)

This invention relates to a method of making taps and dies.

One of the objects of the invention is to provide a combination pin and box tool for the rechasing of damaged threads on sucker rods to the original perfect thread pitch and contact dimension.

Another object is to provide such a tool which will be found of particular advantage in removing dirt, sand and scale from sucker rod pins and boxes before making up the rod string for operating service.

Heretofore in cutting taps and dies, the cutting threads were divided by means of grooves running longitudinally with the tool. This is for the purpose of giving the lateral ends of each of the resulting thread segments a cutting edge. The tap and die were made separately by threading a blank male member externally to form the tap blank and by threading a blank female member to form the die blank. Then each of these blanks was separately placed in a milling machine and the grooves cut across the threads to form the thread segments or lands which act as the cutters, for cleaning out old threads or for cutting new ones. The old method of forming the tap and die required a relatively large number of separate operations and frequently resulted in inaccuracies in the tool. It is therefore another object of my invention to reduce the number of operations required to make such a tool, and to furnish a tool having greater accuracy.

With the foregoing objects outlined and with other objects in view which will appear as the description proceeds, the invention consists in the novel features hereinafter described in detail in connection with the accompanying drawing and more particularly pointed out in the appended claims.

In the drawing:

Fig. 1 is a longitudinal vertical sectional view partly in elevation of the male and female members of the tap and die blanks before the male member has been screwed into the female member.

Fig. 2 is a similar view showing the male member inserted in the female member.

Fig. 3 is a transverse horizontal sectional view taken on the line 3—3 of Fig. 2.

Fig. 4 is a view taken on the same line after the tool has been bored or drilled to form the longitudinal grooves in the male member and female member.

Fig. 5 is a view similar to Fig. 1 but showing the parts after the members have been grooved by boring or drilling.

Fig. 6 is a side elevation of the complete tool with the handles thereof partially broken away.

Referring to the drawing, it will be noted that the parts are made of any suitable metal, and the female blank 8 is internally threaded as shown at 9. The male blank 10 is externally threaded as shown at 11, and the threads of the two parts coincide so that the male blank 10 may be screwed into the female one with a snug fit as shown in Fig. 2. The female blank is preferably provided with handles 12 and auxiliary internal screw threads 13; the latter being adapted to receive the threaded shank 14 of the male blank when the tool is completely assembled.

In accordance with my invention the blanks 8 and 10 are made up in the usual way with the exception of the threaded parts 13 and 14, and as the tap blank 10 and die blank 8 are complementarily threaded for use in cleaning or threading complementary pin and box joints of sucker rods or the like, the threads on the blanks are, of course, complementary and can be made quite accurately in the conventional way. After they have been made, the tap blank is screwed into the die blank as shown in Fig. 2, and then a gang drill or the like, is positioned over the shank of the tap blank and a circular series of holes 15 (Fig. 4) are drilled vertically through the overlapping threads 9, 11, of the tap and die. Afterwards the tap is withdrawn or unscrewed from the die and the result is a finished tap and die having accurately formed longitudinally extending grooves 16 and 17 between thread segments, as shown in Fig. 5.

In this way the tap and die are grooved in a single operation and the complementary lands 18, 19, are perfectly aligned in every way, and when the tool is used for cleaning old threads or cutting new ones on pin and box joints, it will produce threads which match perfectly in every detail.

After the tap and die have been grooved, the threaded portion 14 of the tap is screwed into the threaded portion 13 of the die in order to form the complete tool illustrated in Fig. 6. The upper end portion of such tool will form a die for cleaning or threading the pins of sucker rod joints and the lower ends will form a tap for cleaning or threading the box member of the same joint.

While my improved combination tap and die has been designed specifically for the re-running of threads of the pins and boxes of sucker rods, my method of manufacturing such a tool is applicable to the making of taps and dies for cutting new threads for various purposes.

The herein described and illustrated embodiments have given satisfactory results and it will be obvious to those skilled in the art, after an understanding of the invention, that other changes may be made without departing from the spirit and scope of the invention, and it is intended that all matters contained in the above description or shown in the drawing should be interpreted as illustrative and not in a limiting sense.

What I claim and desire to secure by Letters Patent is:

1. A method of forming a combination tap and die comprising forming external threads on a male member, and complementary internal threads in a female member, screwing the male member into the female member until there is a snug fit between the two members, drilling holes through the overlapping threads of said members and thereby forming longitudinal grooves in each member to provide threaded segments or lands, and withdrawing the male member from the female member.

2. A method of making a combination tap and die comprising forming external threads on a male blank, forming complementary internal threads in a female blank, screwing the male member into the female member, simultaneously drilling a circular series of holes longitudinally of the members through the overlapping threads thereof to provide each member with a series of longitudinal grooves arranged between its thread segments or lands, and then unscrewing the male member from the female member.

3. A method of making a combination tap and die comprising forming external threads on a male blank, forming complementary internal threads in a female blank, screwing the male member into the female member, simultaneously drilling a series of holes longitudinally of the members through the overlapping threads thereof to provide each member with a series of longitudinal grooves arranged between its thread segments or lands, then unscrewing the male member from the female member, and finally securing one end of the male member to the opposite end of the female member.

LYNNE D. BAIRD.